June 27, 1967 F. A. WILMANNS ETAL 3,327,334
METHOD OF MANUFACTURING OUTSOLES
Filed Oct. 16, 1963
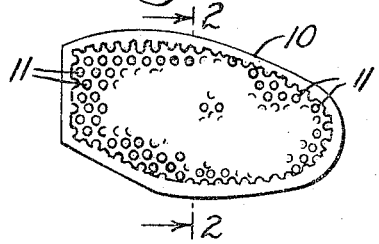
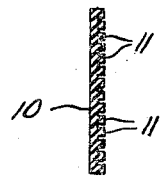
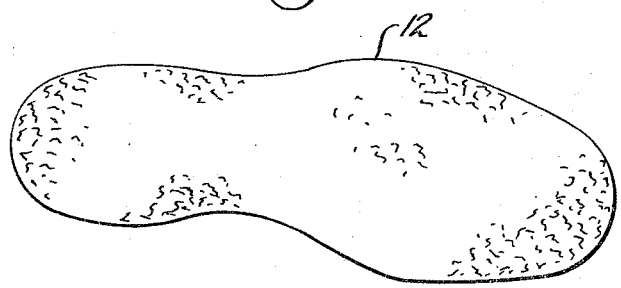
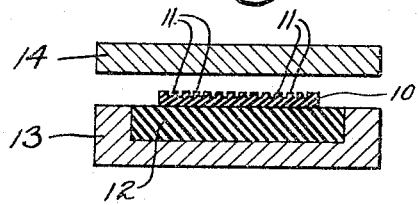
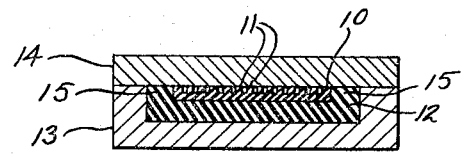
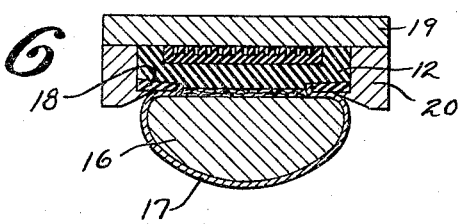
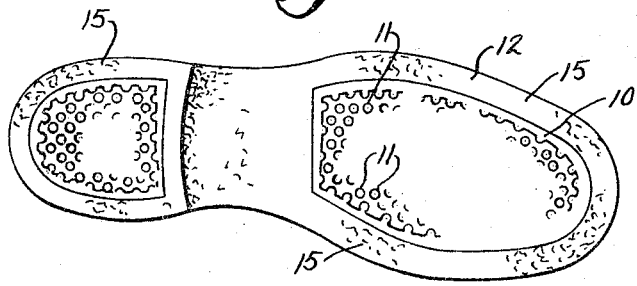
INVENTORS
FREDERICK A. WILMANNS
EDWARD A. OTT
BY
*Morsell & Morsell*
ATTORNEYS

United States Patent Office 3,327,334
Patented June 27, 1967

3,327,334
METHOD OF MANUFACTURING OUTSOLES
Frederick A. Wilmanns, Milwaukee, and Edward A. Ott, Merrill, Wis., assignors, by mesne assignments, to The Weinbrenner Shoe Corporation, Milwaukee, Wis., a corporation of Wisconsin
Filed Oct. 16, 1963, Ser. No. 316,627
6 Claims. (Cl. 12—142)

This invention relates to a method of manufacturing outsoles.

Heretofore it has been common to manufacture shoe outsoles from rubber or other elastic materials and to incorporate a pattern in the tread surface of the shoe sole. In conventional practice these shoe soles are of unitary construction, the material being of the same nature throughout with the pattern elements usually projecting from the surface of the sole. Where the patterns extend to the edges of the outsole any projections forming the design are likely to break off at the edges. This is undesirable.

In the use of rubber or synthetic rubber soles it is often desirable to have a plain tread portion. On other shoes it may be desirable to have a pattern in the tread surface. It may also be desirable to have a plurality of tread patterns which are used interchangeably according to the use to which the shoes are to be put.

It is a general object of the present invention to provide an improved method of manufacturing outsoles which makes it possible for the manufacturer to stock patterned inserts with assorted designs and readily incorporate these inserts in the tread surface of outsoles as required, to thereby provide a patterned outsole where the insert is surrounded by the outsole proper to protect the pattern in use. This eliminates the necessity of stocking outsoles in the various sizes and patterns.

A further object of the invention is to provide a method of manufacturing outsoles which makes it possible to form the inserts separately and of a different material from the outsole proper whereby the inserts may have different properties, including a greater shelf life to enable them to be stored for substantial periods, prior to incorporation in the main outsole portions, without deterioration.

A further, more specific object of the invention is to provide an improved method of manufacturing outsoles with patterned inserts wherein the insert is first molded in specified form with a selected design and then cured, and wherein a main outsole portion is molded to shape and partially cured, and wherein the insert is then superimposed on the main outsole portion and the mold closed while vulcanization of the main outsole is completed to cause embedding of the insert in the surface of the outsole and bonding thereto during the curing of the material of the main outsole.

With the above and other objects in view, the invention consists of the method of manufacturing outsoles, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 1 is a plan view of a molded insert;

FIG. 2 is a sectional view taken on line 2—2 of FIG. 1 after the insert has been molded to the final form and design;

FIG. 3 is a plan view of an outsole blank;

FIG. 4 is a transverse sectional view showing one of the inserts laid in position on a partly-cured outsole in a molding press;

FIG. 5 is a similar view to FIG. 4 after the mold has been closed, showing how the insert is embedded into the outsole while vulcanization of the latter is completed;

FIG. 6 is a view showing a modified method wherein the insert is embedded in and bonded to the outsole simultaneously with the vulcanization of the outsole in position on the last in the manufacture of a shoe, to bond the outsole to the upper and welt; and FIG. 7 is a plan view showing the bottom of a completed outsole and heel manufactured in accordance with the present invention.

Referring more particularly to the drawings, the inserts 10 are cut to the approximate size and shape shown in FIG. 1 from sheets of vulcanizable rubber, synthetic rubber, or combinations of rubber and synthetic materials or from any like material capable of being rendered soft by heat and of being molded and converted by vulcanization to a condition suitable for use as a sole. When the term "rubber" is used in the claims it contemplates any of such materials. These inserts are formed from a suitable compound or mix including a vulcanization agent and other well known ingredients and preferably including chemicals for the purpose of giving increased shelf life to the cured item. The small pieces 10 cut to approximate size as in FIG. 1 are placed in a molding press and molded to the cross-sectional form shown in FIG. 2 with the rubber being vulcanized in the press. This molding is done at approximately 300° F. with a pressure of approximately 1200 lbs. per square inch in approximately 2½ minutes, the press containing a pattern die which causes one surface of the insert to have a pattern 11 in relief. This pattern may be a plurality of small circles surrounded by a border, may be a plurality of small diamonds defined by grooves, or any other desired figures. Upon completion of the inserts to the form of FIG. 2, the inserts may be stored on shelves until ready for use in an outsole and inserts with a variety of patterns may be stored.

The main part of the outsole is also formed of a suitable vulcanizable rubber compound or synthetic rubber mix capable of being vulcanized to form a material which preferably has somewhat different properties than the material of the insert. It is preferably somewhat less resilient than this insert and need not have the increased shelf life. The outsole is also cut from sheets of uncured rubber or rubber-like material to the approximate size and shape desired as shown at 12 in FIG. 3, and is put in a mold which may include the shape of the heel if there is to be an integral heel. The mold is closed and the outsole rubber is partially cured for a short length of time, such as two or three seconds. The mold, which may include a lower die member 13 and an upper movable plate member 14, is then opened and a selected one of the inserts 10 with a selected pattern 11 thereon is laid on top of the partially-cured outsole, as shown in FIG. 4. The mold is then closed and the parts are vulcanized together under suitable pressure for approximately seven minutes at 300° F. During such procedure the insert 10 is pressed into the outsole proper as in FIG. 5 so that the upper portions of the pattern 11 are substantially flush with the surfaces of the surrounding margins 15 of the outsole proper. In view of the fact that the insert has been previously cured this is accomplished without damage to the pattern 11. After completion of the vulcanization, the shoe sole 12, with the insert embedded therein and thoroughly bonded thereto by vulcanization, may be incorporated in a shoe. This may be accomplished by stitching the completed patterned outsole to the welt of a shoe on the last.

The present process also makes it possible to manufacture a rubber outsole with an embedded insert directly on the last in accordance with the general process of Rollman Patent No. 2,789,295, dated Apr. 23, 1957. Referring to FIG. 6, it will be seen that there is a last 16 over which the shoe upper 17 is stretched, there being a welt 18 stitched to the edges of the upper. During such process the procedure of FIG. 5 may be accomplished directly on the last with the use of a molding press having a movable plate 19 and having a surrounding portion 20. The outsole is first partially cured in a position adjacent the welt and lower edges of the upper. Next the mold is opened and the insert 11 is laid on the partially-cured outsole just as in FIG. 4. Thereafter the mold is again closed and embedding of the insert in the outsole in the relationship shown in FIG. 6 is accomplished during vulcanization while all the parts are assembled on the last. Where inserts are incorporated in both the sole and heel the final article will have the appearance shown in FIG. 7. If, however, a separate type of heel is desired, then the outsole may be formed without the integral molded heel and the heel may be attached later. In all cases where the term "outsole" is used in the claim, it contemplates either an outsole having a sole insert with no integral heel, or an outsole having an integral heel with both the sole and heel portions having inserts as in FIG. 7.

In the final article it is to be noted that the insert 10 is completely surrounded by the margin 15 of the outsole proper. Thus the pattern of the insert may, if desired, extend to the extreme edges of the insert, as such pattern will be protected by the marginal portion 15 of the outsole proper, and the projections 11 forming the design cannot break off at the edges.

With the present invention inserts 10 having various types of patterns may be stocked in cured form and kept on the shelf for a substantial length of time. Due to the nature of the material of which the inserts are formed, the mix being such as to provide improved shelf life, there will be no substantial deterioration. In this way molded outsoles may be produced by the manufacturer either with or without inserts. When the inserts are specified, the special process of the present invention is employed and an insert of desired design is selected and incorporated in the sole according to the method of the present invention.

It is apparent from the above that a very simple procedure for manufacturing patterned outsoles has been provided, which method makes it unnecessary for the manufacturer to stock complete patterned outsoles, or various sizes. It is also apparent that the improved patterned outsole has a design embodying projections whose outer ends are substantially flush with the margin of the outsole proper. Thus the traction properties of the design are obtained while the pattern is protected.

Various changes and modifications may be made without departing from the spirit of the invention and all of such changes are contemplated as may come within the scope of the claims.

What we claim is:

1. In a method of manufacturing an outsole, the steps of molding a blank of uncured rubber to form an insert having a tread pattern in relief thereon and effecting curing of the rubber, partially curing another blank of rubber in a mold to form a main outsole, laying a cured patterned insert on the partially-cured main outsole with the insert pattern facing outwardly, and pressing the insert into embedded condition in the main outsole while completing the curing and molding of the main outsole.

2. In a method of manufacturing an outsole, the steps of molding a blank of uncured rubber to form an insert of a type having increased shelf life and having a tread pattern in relief thereon and simultaneously effecting curing of the rubber, partially curing another blank of different rubber in a mold to form a main outsole having different properties from the properties of the insert, laying a cured patterned insert on the partially-cured main outsole with the insert pattern facing outwardly, and pressing the insert into embedded condition in the main outsole while completing curing and molding of the main outsole.

3. In a method of manufacturing an outsole, the steps of molding a blank of uncured rubber to form an insert having predetermined properties and having a tread pattern in relief thereon and simultaneously effecting curing of the rubber, partially curing another blank of rubber in a mold to form a main outsole having different properties from the properties of the insert, laying a cured patterned insert on the partially-cured main outsole with the insert pattern facing outwardly, and pressing the insert into embedded condition in the main outsole while completing curing and molding of the main outsole.

4. In a method of manufacturing an outsole, the steps of molding a blank of uncured rubber to form an insert having a tread pattern which includes a plurality of projections having outer ends and simultaneously effecting curing of the rubber, partially curing another blank of rubber in a mold to form a main outsole, laying a patterned insert on the partially-cured main outsole with the insert pattern facing outwardly, and pressing the insert into embedded condition in the main outsole until the outer ends of the projections of the insert are substantially flush with the surface of the outsole while completing curing, and molding of the main outsole.

5. In a method of manufacturing a shoe, the steps of securing a welt to the edges of an upper, stretching the upper over a last and holding it in position thereon, molding a blank of uncured rubber to form an insert having a tread pattern in relief thereon and simultaneously effecting curing of the rubber, partially curing another blank of rubber in a mold while in position with respect to the upper on the last to form a main outsole on the last, laying a patterned insert on the partially-cured main outsole while the latter is in position on the last with the insert pattern facing outwardly, and pressing the insert into embedded condition in the main outsole while completing curing of the main outsole and bonding of the latter to the welt and upper.

6. In a method of manufacturing outsoles, the steps of molding blanks of uncured rubber to form inserts having increased shelf life and having assorted tread appearances and simultaneously effecting curing of the rubber, storing said assortment of inserts, later partially curing another blank of different rubber in a mold to form a main outsole of selected size having different properties from the properties of the inserts, laying a selected insert on the partially cured main outsole with the tread surface of the insert facing outwardly, and pressing the insert into imbedded condition in the main outsole while completing curing and molding of the main outsole.

References Cited

UNITED STATES PATENTS

| | | | |
|---|---|---|---|
| 1,624,500 | 4/1927 | Murray | 36—32 |
| 1,725,519 | 8/1929 | Hopwood | 36—32 |
| 1,808,063 | 6/1931 | Paterson | 36—32 |
| 2,104,583 | 1/1938 | Daly | 36—32 |
| 2,210,753 | 8/1940 | Field | 12—142 |
| 2,347,872 | 5/1944 | Blanchard | 12—142 |
| 2,486,995 | 11/1949 | Steed | 12—142 |
| 3,116,566 | 1/1964 | Ferreira | 36—30 |

PATRICK D. LAWSON, *Primary Examiner.*

JORDAN FRANKLIN, *Examiner.*

ALFRED R. GUEST, *Assistant Examiner.*